United States Patent
Christiansen et al.

(10) Patent No.: US 6,299,914 B1
(45) Date of Patent: Oct. 9, 2001

(54) COMPOSITIONS AND METHODS FOR CALCIUM FORTIFICATION OF DAIRY PRODUCTS AND OLEAGINOUS FOODS

(75) Inventors: Earl C. Christiansen, South Ogden; Stephen D. Ashmead, Clinton; Mark Pedersen, Kaysville, all of UT (US)

(73) Assignee: Albion International, Inc., Clearfield, UT (US)

( * ) Notice: Subject to any disclaimer, the term of this patent is extended or adjusted under 35 U.S.C. 154(b) by 0 days.

(21) Appl. No.: 09/430,926

(22) Filed: Nov. 1, 1999

(51) Int. Cl.$^7$ ............... A23L 1/304; A23L 1/305
(52) U.S. Cl. ............ 426/74; 426/580; 426/581; 426/582; 426/585; 426/601; 426/607; 426/656
(58) Field of Search .................... 426/580, 585, 426/582, 581, 656, 601, 607, 74

(56) References Cited

U.S. PATENT DOCUMENTS

| | | |
|---|---|---|
| 4,156,021 | 5/1979 | Richardson . |
| 4,446,165 | 5/1984 | Roberts . |
| 4,533,561 | 8/1985 | Ward . |
| 4,599,152 | 7/1986 | Ashmead . |
| 4,784,871 | 11/1988 | Park . |
| 4,830,716 | 5/1989 | Ashmead . |
| 4,863,898 | 9/1989 | Ashmead et al. . |
| 4,871,554 | 10/1989 | Kalala et al. . |
| 5,215,769 | 6/1993 | Fox et al. . |
| 5,296,246 | 3/1994 | Inoue et al. . |
| 5,397,589 | 3/1995 | Korte et al. . |
| 5,449,523 | 9/1995 | Hansen et al. . |
| 5,504,055 | * 4/1996 | Hsu ........................ 504/121 |
| 5,516,925 | 5/1996 | Pedersen et al. . |
| 5,700,513 | * 12/1997 | Mulchandani et al. .......... 426/590 |

* cited by examiner

Primary Examiner—Helen Pratt
(74) Attorney, Agent, or Firm—Thorpe North & Western

(57) ABSTRACT

Calcium amino acid chelate complexes for fortification of dairy products and oleaginous foods, dairy products and oleaginous foods fortified with calcium amino acid chelate complexes, and methods of preparing calcium amino acid chelate complexes are disclosed and described. The calcium amino acid chelate complexes of the present invention are stable, palatable, and bioavailable. Preparation steps include reacting a calcium compound, an amino acid ligand, a pH adjuster, and, optionally, a stabilizing/suspending agent in an aqueous environment.

34 Claims, No Drawings

COMPOSITIONS AND METHODS FOR CALCIUM FORTIFICATION OF DAIRY PRODUCTS AND OLEAGINOUS FOODS

FIELD OF THE INVENTION

This invention is directed toward a calcium amino acid chelate complex for fortification of dairy products and oleaginous foods, dairy products and oleaginous foods fortified with calcium amino acid chelate complexes, and a method of preparing calcium amino acid chelate complexes. The calcium amino acid chelate complexes of the present invention are stable, palatable and bioavailable.

BACKGROUND OF THE INVENTION

It has been widely accepted that calcium is an essential element for formation of bones and teeth in animals, including humans. In fact, though calcium is the most abundant mineral in the body, approximately 99% of the body's calcium is found in the bones and teeth providing an exchangeable pool of calcium. The remaining one percent is widely distributed in cells and body fluids and is responsible for the regulation of a number of metabolic functions such as nerve impulse conduction, muscle fiber contraction, hormone secretion, blood coagulation, normal heart beat, activation of enzymes, and maintenance of cell membranes. Additionally, calcium is receiving much attention on the front line of medical science because it has recently been discovered that calcium is one of the most important elements for supporting many life activities. For example, recent observations indicate that calcium deficiency not only induces osteoporosis, but also contributes to such diseases as hypertension, arteriosclerosis, arthritis, diabetes, immunological diseases, colon cancer, and obesity. Therefore, the presence of sufficient amounts of calcium within the body is essential for proper health.

Dairy products such as cream, sour cream, milk, cheese, ice cream, and yogurt and oleaginous foods such as margarine, butter, lards, and oils are important parts of our daily diet. Though the calcium content found naturally in dairy products and oleaginous foods may be acceptable if consumed at high quantities, there is great public interest in the consumption of calcium fortified dairy products and oleaginous foods that contain a relatively high percentage of stable, palatable and bioavailable calcium.

It is common practice to fortify food products with calcium sources, some of which are insoluble and some of which are soluble at or near neutral pH levels. Additionally, many of the calcium sources disclosed in the prior art for use in the fortification of dairy products and oleaginous foods are insoluble or substantially insoluble at around neutral pH including inorganic and organic acid salts of calcium. These materials result in precipitation causing a chalky feel in the mouth. Some inorganic and organic acid salts of calcium are soluble or substantially soluble at around neutral pH. However, when these salts are used to fortify products containing milk protein, undesirable coagulation and sedimentation often results.

There are also purity concerns with some of the calcium sources cited in the prior art. For example, calcium carbonate derived from bone meal, oyster shell, or other biological origin contains trace amounts of lead and other minerals. Additionally, some calcium carbonates also contain silica. Therefore, it is necessary to take additional amounts of these materials to achieve the same bioavailable calcium level as those taken from synthetic sources of essentially pure calcium.

There are several known factors which affect the absorption of calcium by the human body. Approximately 30% of the calcium contained in a healthy adult's diet is absorbed by the body. However, the absorption of calcium from various foods may range from 10% to 40%. The body's need for calcium is the most significant factor in controlling the absorption process. At very high intakes, the efficiency of calcium absorption decreases.

Another factor to consider is that many forms of ingested calcium are water insoluble and require specific enzymes for proper digestion. These enzymes extract the calcium from food and transport it into the blood stream. However, these transport enzymes are not 100% efficient. This means that the transfer of calcium into the blood stream is at an amount that is less than the total ingested calcium.

On the other hand, biological transport of calcium may be enhanced when the calcium is bound in a chelate structure comprised of calcium and an amino acid. In the area of animal nutrition, the American Association of Feed Control Officials has officially defined an amino acid chelate as "a metal ion from a soluble salt with amino acids with a mole ratio of one mole of metal to one to three (preferably two) moles of amino acids to form coordinate covalent bonds. The average weight of the hydrolyzed amino acids must be approximately 150 and the resulting molecular weight of chelate must not exceed 800."

It is known in the art that amino acid chelates show enhanced bioavailability as compared to non-chelated minerals. Moreover, it is also known that this increased bioavailability is the result of the active transport of amino acid chelates from the digestive tract and into the blood stream. In other words, the chelated mineral ions are absorbed through the intestinal lining and into the blood stream, utilizing the amino acids as active transport carriers. More specifically, amino acid chelates are absorbed intact by mucosal cells in the intestines through active transport as is disclosed in U.S. Pat. No. 4,863,898. Because inorganic calcium salts are ionic, they cannot make use of this active transport mechanism, thereby limiting absorption. Therefore, ingested inorganic calcium salts are less bioavailable than the corresponding calcium amino acid chelates. This is in part due to the fact that competition of ions for active sites and the resulting suppression of one nutritive mineral element by another are both avoided.

It has been documented that amino acid chelates can be prepared from metal ions which do not come from soluble salts. U.S. Pat. Nos. 4,599,152 and 4,830,716 both disclose methods of preparing pure amino acid chelates using metal sources other than soluble metal salts. Additionally, in U.S. Pat. No. 5,516,925, methods of preparing amino acid chelates having improved palatability are also disclosed.

Dairy products and oleaginous foods such as cheese, yogurt, ice cream, cream, milk, margarine, oils, etc., are an important part of the human diet and have traditionally been recognized as good sources of calcium. For example, fresh skim and whole milk both contain approximately 118 mg of calcium per 100 g of milk. As such, milk is advantageously consumed by those persons who may be most in need of an adequate calcium intake including people who are dieting and women who are pregnant or middle aged.

Though most dairy products are naturally good sources of calcium, fortification of dairy products with additional calcium is not a new concept. In U.S. Pat. No. 4,784,871, a calcium fortified yogurt is disclosed. In that patent, an acid soluble salt is added to the fruit flavoring prior to combining the flavoring with the yogurt base. The preferred calcium salt used is tricalcium phosphate, dicalcium phosphate, and hydrates thereof. Further, the amounts used are visually undetectable. Additionally, in U.S. Pat. No. 5,449,523, a calcium fortified yogurt is disclosed. In that patent, the calcium source is added to the yogurt milk base prior to pasteurization without undesirable precipitation. Specifically, the process comprises preparing a yogurt base mix comprised of a fermentable dairy ingredient, a calcium source, a chelating agent, and/or an alkaline agent. The chelating and/or alkaline agents are added in amounts to keep the pH of the yogurt base mix above 6.7 prior to pasteurization. The preferred chelating agents are alkali metal citrates which have the primary task of moderating the pH level.

As mentioned, there are some practical difficulties encountered when incorporating calcium into dairy products, particularly in more fluid products such as milk. These problems exist because most calcium fortificants have very low solubility in dairy products. For example, in milk, up to 60–70% of the calcium exists as insoluble colloidal calcium phosphate associated with casein micelles. Added calcium salts tend to settle out, frustrating attempts to maintain uniform dispersions during manufacturing. This settling often alters the texture of the product. In U.S. Pat. No. 5,397,589, this problem is addressed by providing calcium fortified powdered milk products. The patent alleges improved dispersibility in an aqueous media. Essentially, calcium is blended with a milk product. The calcium fortified mixture is cooled to a temperature so that lactose crystallization is initiated. The product is then dehydrated to form a dry powder that is more easily dispersible in an aqueous media. However, this is a process for the manufacture of dehydrated milk. Once hydrated, there are still difficulties in keeping the calcium source suspended in the aqueous media.

Therefore, there is a great need to provide a bioavailable calcium source for dairy products and oleaginous foods which have improved palatability and stability. This is accomplished by the calcium amino acid chelate complexes of the present invention.

OBJECTS AND SUMMARY OF THE INVENTION

It is therefore an object of the present invention to provide a composition and method for calcium fortification of dairy products and oleaginous foods.

It is another object of the present invention to provide a calcium amino acid chelate complex that is bioavailable so that one may more easily meet the minimum daily requirements for calcium.

It is still another object of the present invention to provide palatable, stable, and appropriately textured dairy products and oleaginous foods which contain a calcium amino acid chelate complex.

Another object of the present invention is to provide a calcium fortificant that is compatible with milks and other dairy products including cream, sour cream, cheese, ice cream, yogurt, etc., as well as to provide a fortificant that is compatible with oleaginous foods such as margarine, butter, lards, oils, etc.

These and other objects may be accomplished by providing compositions and methods for preparing calcium amino chelate complexes for fortification of dairy products and oleaginous foods. Even when these chelate complexes are incorporated into the various dairy products and oleaginous foods, they are stable and maintain appropriate organoleptic properties, i.e., color, texture, taste, smell, and consistency are acceptable.

The calcium amino acid chelate complexes of the present invention are prepared by reacting at least one calcium compound, an amino acid ligand, a pH adjuster, and, optionally, a stabilizing/suspending agent in an aqueous environment at a pH from about 6.5 to 9. The calcium amino acid chelate complex should have an amino acid ligand to calcium molar ratio of about 1:1 and a calcium content from 15 to 22% by weight. Further, the calcium amino acid chelate complex must have a coordinate covalent bond between the α-amino group of the amino acid ligand and the calcium ion.

A first embodiment is prepared by reacting calcium carbonate, an amino acid, and phosphoric acid in an aqueous environment producing a calcium amino acid chelate complex having about a 1:1 amino acid ligand to metal molar ratio. Second, an embodiment may be prepared by reacting calcium oxide, an amino acid, citric acid, and calcium carboxymethylcellulose (CMC) in an aqueous environment producing a calcium amino acid chelate complex having about a 1:1 amino acid ligand to metal molar ratio. A third embodiment may be prepared by reacting calcium oxide, calcium chloride, calcium carboxymethylcellulose (CMC), an amino acid, and phosphoric acid in an aqueous environment producing a calcium amino acid chelate complex having about a 1:1 amino acid ligand to metal molar ratio. A fourth embodiment may be prepared by reacting calcium oxide, calcium chloride, an amino acid, and phosphoric acid in an aqueous environment producing a calcium amino acid chelate complex having about a 1:1 amino acid ligand to metal molar ratio.

Though specific embodiments are disclosed in this specification, one skilled in the art will recognized that numerous variations of these embodiments are possible without departing from the scope of the invention.

DETAILED DESCRIPTION OF THE INVENTION

Before the present invention is disclosed and described, it is to be understood that this invention is not limited to the particular process steps and materials disclosed herein as such process steps and materials may vary to some degree. It is also to be understood that the terminology used herein is used for the purpose of describing particular embodiments only and is not intended to be limiting as the scope of the present invention will be limited only by the appended claims and equivalents thereof.

It must be noted that, as used in this specification and the appended claims, singular forms of "a," "an," and "the" include plural referents unless the content clearly dictates otherwise.

As used herein, the terms "palatable" and "improved palatability" mean that compositions for calcium fortification of dairy products and oleaginous foods of this invention are substantially lacking the metallic aftertaste or disagreeable flavor of prior art calcium fortified products to the extent that they have a more pleasant taste to the consuming warm-blooded host, i.e., an animal or human being. This is not to say that these calcium fortified dairy products and oleaginous foods are completely lacking flavor or taste.

"Bioavailable" means, for purposes of this invention, that the calcium source is available to the body.

"Amino acid chelate" means, for purposes of this invention, that the amino acid forms a heterocyclic ring with the metal as the closing member. Typically, a coordinate covalent bonds exist between the metal ion and the ligand at the α-amino group. However, either ionic bonds, covalent bonds, and/or coordinate covalent bonds may exist between the carboxyl oxygen group and the metal ion.

"Amino acid chelate complex" means that as the pH level of the calcium amino acid chelate is lowered, the reaction between the α-amino group and the calcium remains covalent, but the bond between the carboxyl oxygen and the calcium center becomes more ionic and less covalent. For purposes contained herein, the terms "amino acid chelate" and "amino acid chelate complex" may be used interchangeably, both of which refer to amino acid ligands bonded to metal ions such that a heterocyclic ring is formed with the α-amino nitrogen being covalently bonded to the metal ion. Further, the pH adjuster may act merely to facilitate the reaction or may actually be complexed to the calcium amino acid chelate complex.

"Stable" means that the fortificant of the present invention will not lessen the shelf-life of the dairy product to which the amino acid chelate complex is added and will, in many cases, extend the shelf-life.

"Dairy products" include, but are not limited to, whole milk, low-fat milk, non-fat milk, flavored milk, cheese, processed cheese, yogurt, frozen yogurt, cream, sour cream, low-fat ice cream, non-fat ice cream, and ice cream.

"Oleaginous foods" include, but are not limited to, margarine, butter, lards, and oils.

"Compatible" refers to the fact that the dairy products or oleaginous foods fortified with the amino acid chelate complexes of the present invention do not significantly affect the organoleptic properties, i.e., sensory properties of the underlying dairy or oleaginous product. For example, taste, texture, smell and color of the underlying dairy or oleaginous product are not significantly altered in the presence of the calcium amino acid chelate complexes of the present invention.

With this in mind and without unduly narrowing limitations, the present invention is directed toward compositions and methods of making and preparing calcium amino acid chelate complexes for fortification of dairy products and oleaginous foods as well as actual dairy products and oleaginous foods fortified with these calcium amino acid chelate complexes. The calcium amino acid chelate complexes, when incorporated in dairy products and oleaginous foods, are bioavailable, palatable, and relatively stable for periods of time comparable to the natural shelf life of the dairy products and oleaginous food products in an unfortified state. In fact, due to the stability of the calcium amino acid chelate complexes of the present invention, the fortified dairy products and oleaginous foods may be frozen, refrigerated, or shelf-stored.

In general, a composition for providing a calcium source for calcium fortification of dairy products and oleaginous foods may be prepared by reacting a calcium compound, an amino acid ligand, and a pH adjuster in an aqueous environment at a pH from about 6.5 to 9. The calcium amino acid chelate complex should have an amino acid ligand to calcium molar ratio of about 1:1 and a calcium content from about 15 to 22% by weight. Further, the calcium amino acid chelate complex must include a coordinate covalent bond between the α-amino group of the amino acid ligand and the calcium ion.

The calcium compound may be provided in the form of calcium carbonate, calcium oxide, calcium chloride, or combinations thereof, e.g., calcium oxide/calcium chloride. The amino acid ligand may be selected from the group consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine, and valine. Other ligands may include dipeptides, tripeptides, and tetrapeptides formed by any combination of the aforementioned amino acids. Glycine is particularly preferred as the chelating ligand.

The pH adjuster may be phosphoric acid, citric acid, malic acid, lactic acid, and/or acetic acid. Other possible adjusters and/or buffering agents may also be used. The pH adjuster may either act merely to adjust the pH of the reaction, or alternatively, may actually-complex with the calcium amino acid chelate complexes. Calcium carboxymethylcellulose (CaCMC) may optionally be added as a stabilizing/suspending agent.

There are at least four preferred embodiments of the present invention.

A first preferred embodiment is a calcium amino acid chelate complex prepared by reacting calcium carbonate, glycine, and phosphoric acid in an aqueous environment.

A second preferred embodiment is prepared by reacting calcium oxide, glycine, citric acid, and calcium carboxymethylcellulose (CaCMC) in an aqueous environment.

A third preferred embodiment is a calcium amino acid chelate complex prepared by reacting calcium oxide, calcium chloride, glycine, phosphoric acid, and calcium carboxymethylcellulose (CaCMC) in an aqueous environment.

A fourth preferred embodiment is prepared by reacting calcium oxide, calcium chloride, glycine, and phosphoric acid in an aqueous environment.

These embodiments may be varied by those skilled in th eart withou departing from the scope of the invention.

There are various dairy products and oleaginous foods that may be fortified by one or more embodiments of the present invention. Products such as whole milk, low-fat milk, non-fat milk, flavored milk, cheese, processed cheese, yogurt, frozen yogurt, cream, sour cream, low-fat ice cream, non-fat ice cream and ice cream, margarine, butter, lards, and oils are illustrative. It is important to consider that each of these dairy products and oleaginous foods present different challenges in suspending various calcium sources within that product. For example, with milk, there may be more difficulty in suspending the calcium source over long periods of time than would be the case with yogurt or margarine. Therefore, selection of the calcium amino acid chelate complex, pH balance, and/or use of a suspending agent may require some adjustment with respect to each individual product.

Regarding the specifics of the individual fortified dairy products and oleaginous foods, the calcium fortified dairy products and oleaginous foods of the present invention may have suspended therein a calcium amino acid chelate complex ranging from about 0.01 to 5% by weight based upon the weight of the respective dairy product or oleaginous food. However, weight ranges from 0.1 to 3% are preferred and 0.5 to 1.5% are most preferred. Optionally, emulsifiers and/or stabilizers may be added as well. Effective suspension and homogenization of the calcium fortified dairy products may be enhanced by the addition of hydrocolloid gums or other emulsifiers such as mono or di-glycerides, lecithin, sodium stearyl lactate, or the citric acid ester of a monoglyceride.

A method of preparing a calcium amino acid chelate complex having a ligand to metal molar ratio of about 1:1 is also disclosed. The first step is to admix, in an aqueous environment, the ingredients comprising an amino acid ligand, a calcium compound, a pH adjuster, and, optionally, a stabilizer/suspending agent. Next the ingredients are allowed to react until a pH of from about 6.5 to 9 is reached. Agitation may assist the reaction. Finally, the reacted ingredients are dried, e.g., spray dried, tray dried, oven dried, drum dried, etc., to form a particulate product.

The following examples illustrate the methods and compositions of the present invention. These examples should not be considered as limitations of the present invention, but merely teach how to make the best known calcium amino acid chelate complexes for fortification of dairy products and oleaginous foods based upon current data.

EXAMPLES

Example 1

To a steam kettle was added 46 parts by weight of deionized water which was heated to approximately 160° F. While stirring the water, 8 parts by weight of glycine was added and allowed to dissolve completely. To this solution was added 10.64 parts by weight of calcium carbonate which was blended for approximately 15 minutes by stirring. To this solution, 4.41 parts by weight of phosphoric acid was added very slowly while vigorously stirring. The acid addition caused an exothermic reaction raising the solution temperature by 5–15° F. While mixing in the above ingredients, the solution will begin to bubble and/or foam and may sometimes spatter. Thus, proper eye and clothing protection should be used. The solution was then heated to 170–180° F. and stirred continuously for about one hour. The heated solution was then filtered and spray dried producing a calcium glycine chelate having a calcium content of 20% by weight. The amino acid chelate complex has a ligand to metal molar ratio of about 1:1. The product obtained was a scentless, white fine powder. The particle size of the calcium amino acid chelate complex is preferably within a range of 60–170 mesh and most preferably about 100 mesh. When reconstituted in water the solution has a pH of about 7.91. The calcium source prepared as described above was stable at 106° F. for 12 weeks.

The calcium amino acid chelate made by the above process can then be added to a dairy product such as cream, sour cream, milk, cheese, ice cream, yogurt, and the like and/or oleaginous foods such as margarine, butter, lards, and oils.

Example 2
2% Milk Fortified with a Calcium Amino Acid Chelate Complex

Calcium fortified milk was prepared as follows. The calcium amino acid chelate complex of Example 1 was prepared. Next, to one gallon of low fat milk, 16.5 g of the calcium amino acid chelate (0.4% by weight of the total product) and 1.0 g 6/BF carrageenan (0.02% by weight of the total product) were added. The milk was then homogenized, pasteurized and stored in a refrigerator at a temperature of 35.6–37.4° F. The fortified milk was found to be stable, without significant sediment and of good flavor after 8 weeks of storage. The final product contained 600 mg of calcium per 8 oz. serving.

Example 3
Taste Test of 2 Milk Fortified with a Calcium Amino Acid Chelate Complex A taste test was conducted by a panel of 20 randomly selected persons. Each panelist was asked to drink ½ glass of milk (4 oz.) prepared as described in Example 2 along with eating a cookie. Each panelist was then asked to rate the taste of the calcium fortified milk. Fifteen out of the twenty stated that the milk was better in taste than expected and four out of the remaining five stated the taste of the milk was acceptable. Seven out of the twenty indicated that, if given a choice, they would substitute the product containing the calcium amino acid chelate complex for their regular milk and nine out of the twenty stated they would buy this product in addition to their regular milk.

Example 4

A second embodiment of a calcium amino acid chelate complex was prepared by evenly splitting 2070 pounds of water into two tanks (1035 pounds in each tank). To the first tank, 361 pounds of glycine was added and blended for 15 minutes forming a clear solution. To the second tank, 269 pounds of calcium oxide, 48 pounds of calcium carboxy methyl cellulose (CaCMC) and 5 pounds of a silica based anti-caking agent were added to the water and blended for 15 minutes maintaining the temperature below 140° F. to form a milky solution. The contents of both tanks were then combined, blended and held for 30 minutes at 140° F. Once this process was complete, 319 pounds of citric acid was slowly added to the mixture. The addition of citric acid caused the mixture to heat up, but the temperature was maintained at about 150° F. After about ⅔ of the citric acid was added, the product began to thicken. As such, the addition of the citric acid was done slowly with vigorous agitation and this agitation was maintained throughout the process. Once complete, the product was then spray dried to a particle size of from 100 to 200 mesh. An assay of the product resulted in a white powder having not less than 17.5% calcium and not more than 5% moisture.

Example 5
2% Milk Fortified with a Calcium Amino Acid Chelate Complex

This model formulation for milk fortified with a calcium amino acid chelate complex as described in Example 4 will provide a product having 600 mg of calcium per 8-fl oz. of milk.

| Ingredients | |
|---|---|
| weight | |
| 99.24% | milk standardized to 2% milk fat and 10% milk solids |
| 0.01% | vitamin A and D |
| 0.75% | calcium amino acid chelate complex of Example 4 |

A calcium amino acid chelate complex fortified milk product was prepared as the milk, milk fat, and milk solids were standardized to prescribed levels. Under good agitation, the dry ingredients were added including the calcium amino acid chelate complex of Example 4. The mixture was pasteurized at 170° F. for 30 seconds and homogenized at 2000 psi. Once complete, the product was cooled to from 38 to 40° F. At this point, the product may be packaged, preferably in a container labeled to shake well before using to minimize any variations in calcium content throughout the package.

Example 6

A third embodiment of a calcium amino acid chelate complex was prepared by evenly splitting 2070 pounds of water into two tanks (1035 pounds in each tank). To the first tank, 359 pounds of glycine was added and blended for 15 minutes forming a clear solution. To the second tank, 239 pounds of calcium oxide, 48 pounds of calcium chloride and 48 pounds of calcium carboxy methyl cellulose (CaCMC) were added to the water and blended for 15 minutes maintaining the temperature below 140° F. to form a milky solution. The contents of both tanks were then combined, blended and held for 30 minutes at 140° F. Once this process was complete, 306.5 pounds of phosphoric acid (85%) was slowly added to the mixture. The addition of phosphoric acid caused the mixture to heat up, but the temperature was maintained at about 150° F. After about ⅔ of the phosphoric acid was added, the product began to thicken so the continued addition of the phosphoric acid was done slowly with vigorous agitation. The product was then allowed to react to completion reaching a pH of about 7.5. Vigorous agitation was maintained during this process. Once complete, the product was then spray dried to a particle size of from 100 to 200 mesh. An assay of the product results in a white powdered calcium amino acid chelate powder having a calcium content of not less than 18%, a moisture content of not more than 5%, and a pH of about 9. The product had a clean and non-bitter taste.

Example 7

2% Milk Fortified with a Calcium Amino Acid Chelate Complex

This model formulation for milk fortified with a calcium amino acid chelate complex as described in Example 6 will provide a product having 600 mg of calcium per 8-fl oz. of milk.

| weight | Ingredients |
| --- | --- |
| 99.29% | milk standardized to 2% milk fat and 10% milk solids non-fat |
| 0.01% | vitamin A and D |
| 0.7% | calcium amino acid chelate complex of Example 6 |

A calcium amino acid chelate complex fortified milk product was prepared as the milk, milk fat, and milk solids were standardized to prescribed levels. Under good agitation, the dry ingredients were added including the calcium amino acid chelate complex of Example 6. The mixture was pasteurized at 170° F. for 30 seconds and homogenized at 2000 psi. Once complete, the product was cooled to 38–40° F. At this point, the product may be packaged, preferably in a container labeled to shake well before using to minimize any variations in calcium content throughout the package.

Example 8

Yogurt Fortified with a Calcium Amino Acid Chelate Complex

This model formulation for yogurt fortified with a calcium amino acid chelate complex as described in Example 6 will provide product having 600 mg of calcium per 8 ounces of yogurt.

| weight | Ingredients |
| --- | --- |
| 71.15% | milk standardized to 2% milk fat and 11% milk solids non-fat |
| 4% | sugar |
| 2% | whey protein concentrate |
| 1.5% | modified food starch |
| 0.3% | gelatin |
| 0.3% | culture |
| 20% | fruit and flavoring |
| 0.75% | calcium amino acid chelate complex of Example 6 |

A calcium amino acid chelate complex fortified yogurt product was prepared as the milk, milk fat, and milk solids were standardized to the prescribed levels. Under good agitation, the dry ingredients were added including the calcium amino acid chelate complex of Example 6. The product was pasteurized at 195° F. for 3 to 6 minutes and homogenized at 1000 psi. The product was then cooled to 107–112° F., inoculated with the starter culture and held in a tank at from 105 to 108° F. until a pH of 4.5 was reached. Next, the product was gently agitated and cooled to 60–65° F., mixed with fruit and flavoring and then packaged in a container. Finally, the yogurt product was cooled to 38–40° F.

Example 9

A fourth embodiment of a calcium amino acid chelate complex was prepared by evenly splitting 2070 pounds of water into two tanks (1035 pounds in each tank). To the first tank, 378 pounds of glycine was added and blended for 15 minutes forming a clear solution. To the second tank, 252 pounds of calcium oxide and 50 pounds of calcium chloride were added to the water and blended for 15 minutes maintaining the temperature below 140° F. forming a milky solution. The contents of both tanks were then combined, blended and held for 30 minutes at 140° F. Once this process was complete, 322.6 pounds of phosphoric acid (85%) was slowly added to the mixture. The addition of phosphoric acid caused the mixture to heat up, but the temperature was maintained at about 150° F. After about ⅔ of the phosphoric acid was added, the product began to thicken so the continued addition of the phosphoric acid was done slowly with vigorous agitation. The product was then allowed to react to completion reaching a pH of about 7.5. Vigorous agitation was maintained during this process. Once complete, the product was then spray dried to a particle size of from 100 to 200 mesh. An assay of the product results in a white powdered calcium amino acid chelate powder having a calcium content of not less than 18%, a moisture content of not more than 5%, and a pH of about 8. The product had a clean and non-bitter taste.

Example 10

80% Fat Soft Margarine Fortified with Calcium Amino Acid Chelate Complexes

This model formulation for soft margarine fortified with a calcium amino acid chelate complex as described in Example 9 will provide a product having 200 mg of calcium per ounce margarine.

Fat Phase

| weight | |
|---|---|
| 22% | partially hydrogenated soybean oil |
| 58% | liquid soybean oil |
| 0.2% | lecithin |
| 0.2% | emulsifier |
| 0.004% | beta carotene (color & vitamin A) |

Water Phase

| weight | |
|---|---|
| 12.906% | water |
| 1.2% | salt |
| 1% | non-fat dry milk |
| 4.32% | calcium amino acid chelate of Example 6 or 9 |
| 0.1% | potassium sorbate |
| 0.05% | citric acid |
| 0.02% | natural & artificial butter flavor |

A calcium amino acid chelate complex fortified margarine product was prepared by mixing the fat phase ingredients and heating to 122° F. Next, the water phase ingredients were mixed separately and also heated to 122° F. To prepare the emulsion, the water phase was slowly added to the fat phase with high sheer. The emulsion was then run through a scrape surface heat exchanger. The product may then be packaged and tempered at 41° F. for 24 to 48 hours.

Example 11
American Pasteurized Process Cheese Fortified with a Calcium Amino Acid Chelate Complex This model formulation for American pasteurized process cheese fortified with a calcium amino acid chelate complex as described in Example 9 will provide a product having 400 mg of calcium per ounce cheese.

Ingredients

| weight | |
|---|---|
| 85.2% | blended American cheeses |
| 1% | salt |
| 8% | water |
| 1% | sodium citrate |
| 0.15% | disodium phosphate |
| 0.15% | sodium pyrophosphate |
| 0.2% | annatto color |
| 4.3% | calcium amino acid chelate complex of Example 9 |

A calcium amino acid chelate complex of fortified American pasteurized process cheese was prepared by selecting a blend of mild, medium, sharp chedders and jack cheeses that delivered a desired flavor profile (this may be modified according to taste preference). The cheeses were warmed to room temperature and then ground into fine pieces. The ground up cheese pieces were placed into a steam cooker under slow agitation until the cheese was melted throughout. Water was added to attain a 40% moisture level. Salt, color and the calcium amino acid chelate complex of Example 9 was then added. Emulsifying salts were then added to the mixture before the temperature reached 120° F. The pH level should remain between 5.6 and 6. However, if the pH level rises above 6.0, small amounts of lactic acid may be added to reduce the pH level. The entire batch was cooked until the temperature reached 170° F. for about 3 minutes. The batch was then poured into a filler where the pH and moisture levels were once again confirmed. The product may be filled into desired size packages or formed into slices. Finally, the packaged cheese was tempered at room temperature for 4 to 18 hours.

Example 12
Low-Fat Frozen Yogurt Fortified with a Calcium Amino Acid Chelate Complex This model formulation for low-fat frozen yogurt fortified with a calcium amino acid chelate complex described in Example 9 will provide a product having 400 mg of calcium per 4 fl oz. of low-fat frozen yogurt.

Mix Portion

| weight | |
|---|---|
| 78.8% | milk standardized to 2% milk fat and 11% milk solids non-fat |
| 12% | sugar |
| 1% | whey protein concentrate |
| 6% | corn syrup solids |
| 0.4% | stabilizer/emulsifier |
| 0.6% | flavoring |
| 1.2% | calcium amino acid chelate complex of Example 9 |

Yogurt Potion

| weight | |
|---|---|
| 99.7% | milk standardized to 11% milk solids non-fat |
| 0.3% | culture |

A calcium amino acid chelate complex fortified low-fat frozen yogurt was prepared by blending the mix portion with the yogurt portion at a 4:1 ratio by weight.

The mix portion was prepared by standardizing the milk, milk fat, and milk solids to the prescribed levels. Under good agitation, dry ingredients including the calcium amino acid chelate of Example 9 were admixed into the milk (excluding the flavoring). This mixture was pasteurized at 190° F. for 45 seconds and homogenized at 1,500 psi. The product was then cooled to from 38 to 40° F. and held in a blending tank.

The yogurt portion was prepared by standardizing the milk and milk solids to the prescribed levels where they were pasteurized at 195° F. for 3–6 minutes and homogenized at 1000 psi. The product was then cooled to 107–112° F. where it was inoculated with the starter culture. The tank was held at 105–108° F. until the pH reached 4.6. At this point, the acidic product was gently agitated and cooled to 40–45° F.

Once both the mix portion and the yogurt portion were complete, they were blended through a smoothing valve (20% yogurt portion by weight and 80% mix portion by weight). The blend was held in a tank under slow agitation for 4 hours. Once complete, flavors were mixed into the yogurt product which was then sent to the continuous freezer set at 80% overrun.

Example 13
Ice Cream Fortified with a Calcium Amino Acid Chelate Complex

This model formulation for ice cream fortified with a calcium amino acid chelate complex described in Example 9 will provide a product having 400 mg of calcium per 4 fl oz. of ice cream.

| weight | Ingredients |
|---|---|
| 54.85% | milk |
| 20% | cream standardized to 40% milk fat |
| 6% | non-fat dry milk |
| 12% | sugar |
| 5% | corn syrup solids |
| 0.4% | stabilizer/emulsifier |
| 0.5% | flavor and coloring |
| 1.25% | calcium amino acid chelate as in Example 9 |

A calcium amino acid chelate complex fortified ice cream product was prepared by standardizing the milk, milk fat, and milk solids to the prescribed levels. Under good agitation, the dry ingredients including the calcium amino acid chelate complex of Example 9 were added. The product was pasteurized at 180° F. for 35 seconds and homogenized at 2200 psi. Next, the pasteurized and homogenized product was cooled to from 38 to 40° F. and held in a storage tank for from 4 to 24 hours. The flavor and color were then mixed into the vat containing the product. Once complete, the ice cream product was then sent to the continuous freezer set at 100% overrun.

While the invention has been described with reference to certain preferred embodiments, those skilled in the art will appreciate that various modifications, changes, omissions and substitutions can be made without departing from the spirit of the invention. It is intended, therefore, that the invention be limited only by the scope of the following claims.

We claim:

1. A calcium amino acid chelate complex prepared by reacting at least one calcium compound, an amino acid ligand, a pH adjuster, and calcium carboxymethylcellulose (CaCMC) in addition to the at least one calcium compound, in an aqueous environment at a pH from about 6.5 to 9, said calcium amino acid chelate complex having an amino acid ligand to calcium molar ratio of about 1:1 and a calcium content from about 15 to 22% by weight, said calcium carboxymethylcellulose being present at from 2% to 8% by weight; and drying said calcium amino acid chelate complex, such that said calcium amino acid chelate complex includes a coordinate covalent bond between the α-amino group of said amino acid ligand and said calcium.

2. A calcium amino acid chelate complex as in claim 1 wherein said calcium compound is selected from the group consisting of calcium carbonate, calcium oxide, calcium chloride, and combinations thereof.

3. A calcium amino acid chelate complex as in claim 2 wherein said amino acid ligand is selected from the group consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine, and, dipeptides, tripeptides, and tetrapeptides formed by any combination of said amino acids thereof.

4. A calcium amino acid chelate complex as in claim 3 wherein said pH adjuster is selected from the group consisting of phosphoric acid, citric acid, malic acid, lactic acid, acetic acid, and combinations thereof.

5. A calcium amino acid chelate complex as in claim 4 wherein said amino acid ligand is glycine.

6. A calcium amino acid chelate complex as in claim 1 prepared by reacting calcium oxide, glycine, citric acid, and calcium carboxymethylcellulose (CaCMC) in an aqueous environment.

7. A calcium amino acid chelate complex as in claim 1 prepared by reacting calcium oxide, calcium chloride, glycine, phosphoric acid, and calcium carboxymethylcellulose (CaCMC) in an aqueous environment.

8. A dairy product or oleaginous food product fortified with from 0.01 to 5% by weight of a calcium amino acid chelate complex, said calcium amino chelate complex prepared by reacting at least one calcium compound, an amino acid ligand, and a pH adjuster in an aqueous environment, said calcium amino acid chelate complex having an amino acid ligand to calcium molar ratio of about 1:1, and wherein said calcium amino acid chelate complex includes a coordinate covalent bond between the α-amino group of said amino acid ligand and said calcium.

9. A dairy product or oleaginous food product as in claim 8 wherein said amino acid ligand is selected from the group consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine, and valine, and dipeptides, tripeptides, and tetrapeptides formed by any combination of said amino acids thereof.

10. A dairy product or oleaginous food product as in claim 9 wherein said pH adjuster is selected from the group consisting of phosphoric acid, citric acid, malic acid, lactic acid, acetic acid, and combinations thereof.

11. A dairy product or oleaginous food product as in claim 10 wherein said amino acid ligand is glycine.

12. A diary product or oleaginous food product as in claim 11 wherein said calcium amino acid chelate complex is prepared by reacting calcium carbonate, glycine, and phosphoric acid in an aqueous environment.

13. A dairy product or oleaginous food product as in claim 11 wherein said calcium amino acid chelate complex is prepared by reacting calcium oxide, calcium chloride, glycine, and phosphoric acid.

14. A dairy product or oleaginous food product as in claim 11 wherein said dairy product or oleaginous food product is a member selected from the group consisting of whole milk, low-fat milk, non-fat milk, flavored milk, cheese, processed cheese, yogurt, frozen yogurt, cream, sour cream, low-fat ice cream, non-fat ice cream, ice cream, margarine, butter, lards, and oils.

15. A dairy product or oleaginous food product as in claim 11 wherein said calcium amino acid chelate complex is from about 0.1 to 3% of said dairy product by weight.

16. A dairy product or oleaginous food product as in claim 15 which further comprises from about 0.05 to 3% by weight of emulsifier/stabilizer.

17. A dairy product or oleaginous food product as in claim 16 wherein said emulsifier/stabilizer is selected from the group consisting of monoglyceride, diglyceride, lecithin, sodium stearyl lactate, citric acid ester of monoglyceride, hydrocolloid gum, and combinations thereof.

18. A dairy product or oleaginous food product as in claim 11 wherein from 2 to 8% by weight of calcium carboxymethylcellulose (CaCMC) is reacted as a stabilizing/suspending agent with said calcium compound, said amino acid ligand, and said pH adjuster to form said calcium amino acid chelate complex.

19. A dairy product or oleaginous food product as in claim 18 wherein said calcium amino acid chelate complex is prepared by reacting calcium oxide, glycine, citric acid, and calcium carboxymethylcellulose (CaCMC) in an aqueous environment.

20. A dairy product or oleaginous food product as in claim 18 wherein said calcium amino acid chelate complex is prepared by reacting calcium oxide, calcium chloride, glycine, phosphoric acid, and calcium carboxymethylcellulose (CaCMC).

21. A dairy product or oleaginous food product as in claim 18 wherein said dairy product or oleaginous food product is a member selected from the group consisting of whole milk, low-fat milk, non-fat milk, flavored milk, cheese, processed cheese, yogurt, frozen yogurt, cream, sour cream, low-fat ice cream, non-fat ice cream, ice cream, margarine, butter, lards, and oils.

22. A method of preparing a calcium amino acid chelate complex having a ligand to calcium molar ratio of about 1:1 comprising the steps of:

admixing, in an aqueous environment, ingredients comprising an amino acid ligand, a calcium compound, a pH adjuster, and calcium carboxymethylcellulose in addition to the at least one calcium compound;

allowing said ingredients to react until a pH from about 6.5 to 9 is reached; and drying said reacted ingredients to form a particulate product, wherein said calcium content is from about 15 to 22% by weight, said calcium carboxymethylcellulose is present at from 2% to 8% by weight, and wherein said calcium amino acid chelate complex includes a coordinate covalent bond between the α-amino group of said amino acid ligand and said calcium.

23. A method of preparing a calcium amino acid chelate complex as in claim 22 wherein said calcium compound is selected from the group consisting of calcium carbonate, calcium oxide, calcium chloride, and combinations thereof.

24. A method of preparing a calcium amino acid chelate complex as in claim 23 wherein said amino acid ligand is selected from the group consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine, and valine, and dipeptides, tripeptides, and tetrapeptides formed by any combination of said amino acids thereof.

25. A method of preparing a calcium amino acid chelate complex as in claim 24 wherein said pH adjuster is selected from the group consisting of phosphoric acid, citric acid, malic acid, lactic acid, acetic acid, and combinations thereof.

26. A method of preparing a calcium amino acid chelate complex as in claim 22 wherein said calcium compound is calcium oxide, said amino acid ligand is glycine, and said pH adjuster is citric acid and said calcium carboxymethylcellulose (CaCMC) is included in said reaction.

27. A method of preparing a calcium amino acid chelate complex as in claim 22 wherein said calcium compound is a combination of calcium oxide and calcium chloride, said amino acid ligand is glycine, said pH adjuster is phosphoric acid, and said calcium carboxy methyl cellulose (CaCMC) is included in said reaction.

28. A method of preparing a calcium amino acid chelate complex as in claim 28 wherein said drying step is by a method selected from the group consisting of spray drying, tray drying, drum drying, and oven drying.

29. A calcium amino acid chelate complex prepared by reacting at least one calcium compound, an amino acid ligand, and phosphoric acid in an aqueous environment at a pH from about 6.5 to 9, said calcium amino acid chelate complex having an amino acid ligand to calcium molar ratio of about 1:1 and a calcium content from about 15 to 22% by weight, and wherein said calcium amino acid chelate complex includes a coordinate covalent bond between the α-amino group of said amino acid ligand and said calcium.

30. A calcium amino acid chelate complex as in claim 29 prepared by reacting calcium carbonate, glycine, and phosphoric acid in an aqueous environment.

31. A calcium amino acid chelate complex as in claim 29 prepared by reacting calcium oxide, calcium chloride, glycine, and phosphoric acid in an aqueous environment.

32. A method of preparing a calcium amino acid chelate complex having a ligand to calcium molar ratio of about 1:1 comprising the steps of:

admixing, in an aqueous environment, ingredients comprising an amino acid ligand, a calcium compound, and phosphoric acid;

allowing said ingredients to react until a pH from about 6.5 to 9 is reached; and drying said reacted ingredients to form a particulate product, wherein said particulate product has a calcium content is from about 15 to 22% by weight, and wherein said calcium amino acid chelate complex includes a coordinate covalent bond between the α-amino group of said amino acid ligand and said calcium.

33. A method of preparing a calcium amino acid chelate complex as in claim 32 wherein said calcium compound is calcium carbonate and said amino acid ligand is glycine.

34. A method of preparing a calcium amino acid chelate complex as in claim 32 wherein said calcium compound is a combination of calcium oxide and calcium chloride and said amino acid ligand is glycine.

* * * * *